Dec. 11, 1928.          N. H. KNOWLTON          1,694,445
SOLE PRESSING MACHINE
Filed Nov. 18, 1927          2 Sheets-Sheet 1

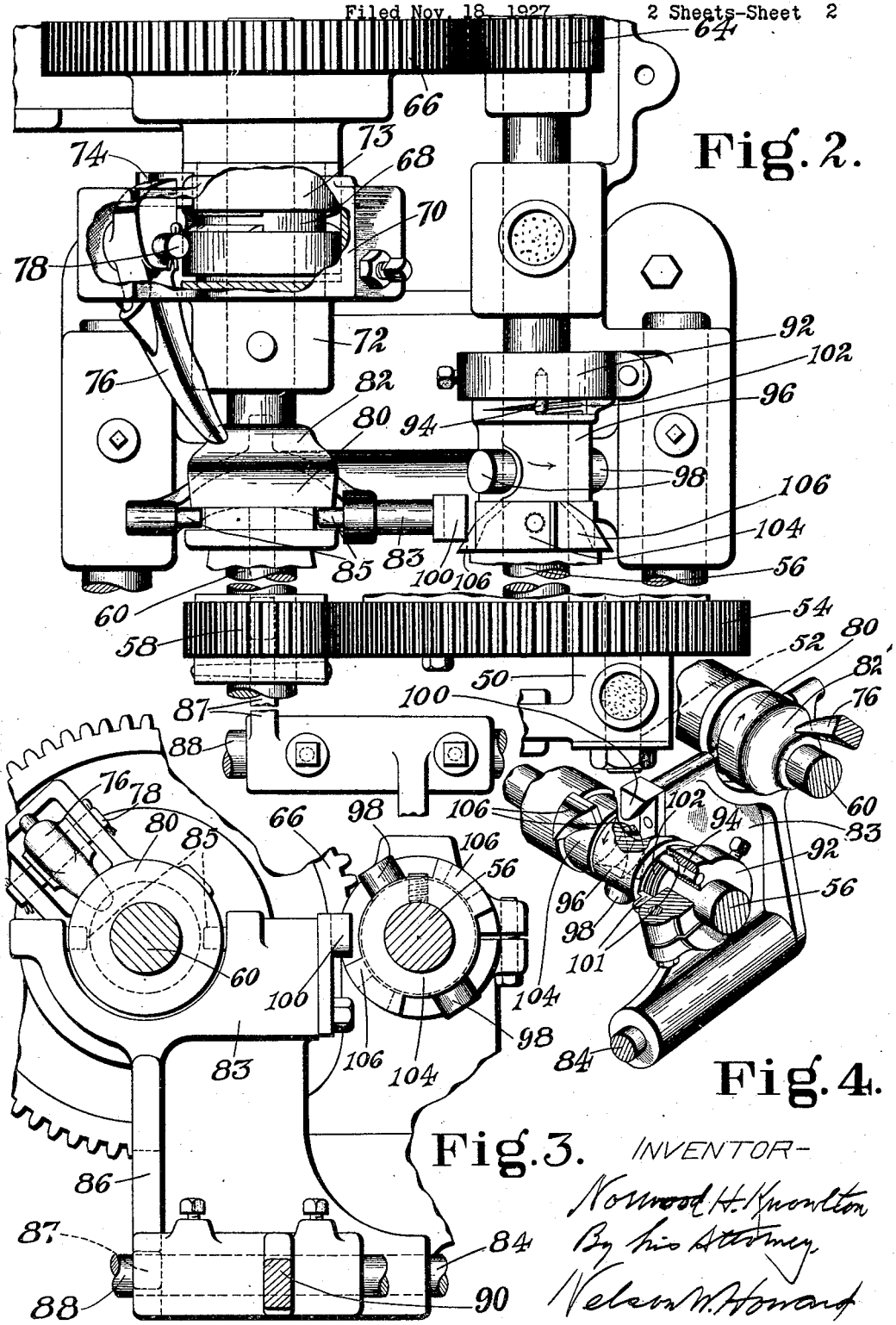

Patented Dec. 11, 1928.

1,694,445

UNITED STATES PATENT OFFICE.

NORWOOD H. KNOWLTON, OF ROCKPORT, MASSACHUSETTS, ASSIGNOR TO UNITED SHOE MACHINERY CORPORATION, OF PATERSON, NEW JERSEY, A CORPORATION OF NEW JERSEY.

SOLE-PRESSING MACHINE.

Application filed November 18, 1927. Serial No. 234,262.

This invention relates to machines for applying pressure to the bottoms of shoes, and is herein illustrated in its application to a sole-laying or pressing machine of the well-known type disclosed in United States Letters Patent No. 1,549,243, granted on August 11, 1925, upon an application of E. E. Winkley. It is to be understood, however, that the invention in its more general aspects is not limited to machines of that particular type.

In machines constructed as shown in the above-mentioned Letters Patent there are twin pressure-applying mechanisms each including a toggle which is straightened to force a sole-pressing pad into pressing relation to a shoe and is thereafter broken to release the shoe from pressure, the arrangement being such that in each cycle of operations of the machine a shoe presented by the operator to one of the twin mechanisms is subjected to pressure and a shoe previously operated upon by the other mechanism is released from pressure. Associated with the two toggle mechanisms is a heavy spring through which the pressure is yieldingly applied. The machine is a comparatively high speed machine and is driven through a friction clutch one of the elements of which is forced into operative engagement with its co-operating element by the depression of a treadle. At the beginning of each cycle of operations the toggle of that mechanism in which a shoe is under pressure is broken before the other mechanism becomes effective to apply any substantial pressure to the shoe presented thereto, and consequently the clutch at that time in the cycle is subjected to the force of the heavy pressure-applying spring, as it is also later in the cycle in applying pressure to another shoe. It is important, therefore, for the proper operation of the machine that the cooperating friction clutch elements shall engage each other firmly enough to prevent the clutch from slipping under the force of the spring.

It is an object of this invention to guard against such slipping of the clutch in case the operator does not apply sufficient force to the treadle in starting the machine to cause the co-operating friction clutch elements to engage each other with the required pressure. To this end, the invention provides automatic means for insuring firm driving engagement between the clutch elements, the construction shown comprising a power-driven member arranged to act on the clutch after the starting of the machine to effect a firmer driving engagement between the clutch elements in case they have not already been engaged with the required pressure by the use of the treadle. In the illustrative embodiment of the invention the power-driven member comprises a cam rotatable about an axis parallel to the axis of the clutch in such a position as to act, under the conditions above mentioned, to impart a supplemental movement to a treadle-operated member which is movable lengthwise of the axis of the clutch to start the machine. If the operator, therefore, starts the machine by comparatively light pressure on the treadle, the cam will immediately force the treadle-operated clutch element into firmer engagement with its co-operating element. In addition to the insurance thus afforded that the clutch elements will engage each other with the required pressure, there is the further advantage that the operator is enabled to control the machine easily without the exercise of any particular care as to the manner of starting it.

The invention will now be more particularly described by reference to the accompanying drawings and thereafter pointed out in the claims.

In the drawings,

Fig. 2 is a plan view of a portion of the driving mechanism;

Fig. 3 is a view in front elevation of a portion of the mechanism shown in Fig. 2; and Fig. 4 is a perspective view, with parts broken away, illustrating more fully certain details of the controlling means.

Figure 1:
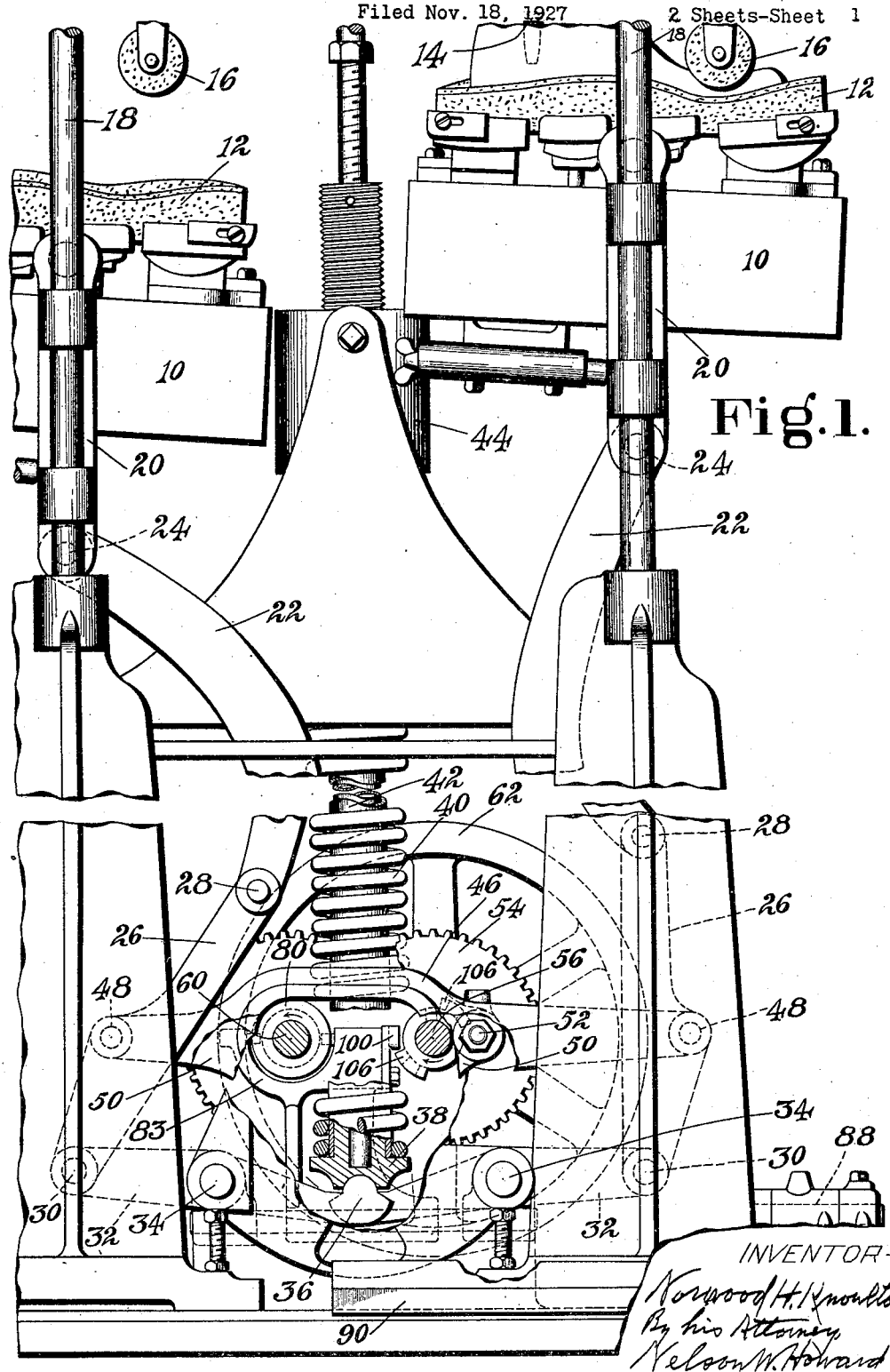
Fig. 1 is a view in front elevation, with parts broken away, of a portion of a machine of the type shown in the Letters Patent hereinabove mentioned, with the present invention embodied therein.

In its general organization, as more fully disclosed in the above-mentioned Letters Patent, the machine herein shown comprises twin mechanisms for applying sole-laying or shaping pressure to the bottoms of different shoes alternately, each of these mechanisms comprising a pad box 10 having a yieldable pad 12 thereon for applying pressure to the sole of a shoe, and a jack for supporting the shoe against the upward pressure of the pad on the sole. The jack is not shown in detail, but includes a pin 14 for engaging a last in its spindle hole and a toe rest roll 16, the jack as a whole being mounted on parallel upright rods 18 upon which is slidingly mounted a holder 20 which carries the pad box 10. Operative movement is imparted to each holder 20 by means of a toggle comprising an upper toggle link 22 pivoted at 24 to the holder and a lower toggle link 26 which is pivoted at 28 to the link 22 and at its lower end is pivoted at 30 to a lever 32 fulcrumed on a fixed pin 34. The two levers 32 extend inwardly toward each other, and their inner ends are arranged side by side, as illustrated at 36 (Fig. 1), in engagement with an abutment 38 at the lower end of a heavy spring 40 which is mounted on a guide 42 and is supported at its upper end by a member 44, as more fully disclosed in the Letters Patent mentioned. It will be understood that upward movement of each pad box 10 to apply pressure to a shoe is effected by straightening its toggle 22, 26, and that in the latter part of the pressure-applying operation the lever 32 which supports the lower toggle link 26 yields against the resistance of the spring 40, so that the pressure is yieldingly applied and by reason of the length of the spring is of approximately the same degree irrespective of such variations as there may be in the heights of shoes of different sizes supported by the jack.

The opposite pairs of toggle links are connected together by means of a cross-link 46 the opposite ends of which are pivoted at 48 to the lower toggle links 26, so that when the toggle of one of the twin pressure-applying mechanisms is straightened to apply pressure to a shoe presented thereto, the toggle of the other mechanism is broken to release a shoe previously operated upon by that mechanism. Operative movements are imparted to both of the twin pressure mechanisms by means of a link 50 one end of which is connected at 48 to the link 26 of the left-hand toggle (Fig. 1) and the opposite end to a wrist-pin 52 on a gear wheel 54 which is fast on a shaft 56. The gear wheel 54 is driven by a comparatively small pinion 58 fast on a clutch-driven shaft 60 which is parallel to the shaft 56.

The machine is operated by power through a belt pulley 62 (Fig. 1) which is loosely mounted on the shaft 56 and drives a pinion 64 (Fig. 2) which in turn drives a comparatively large gear wheel 66 loosely mounted on the shaft 60. The gear wheel 66 is provided with a hub portion 68 which serves as one of the elements of a friction clutch and extends within a member 70 which has a hub portion 72 secured to the shaft 60.

Within the member 70 is mounted a spiral clutch member 73 which encircles the hub 68 and is held fast at one end to the member 70, the other end of the spiral clutch member 73 having thereon a lug 74 which is arranged to be engaged on one side by one end of a lever 76 pivoted at 78 to the member 70. It will be understood that the lever 76 by swinging movement acts on the lug 74 to contract the spiral clutch member 73 and thereby effect a driving connection between the member 68 of the clutch and the shaft 60 on which the member 70 is mounted. Operation of the lever 76 to effect the engagement of the clutch elements 68 and 73 with each other is effected by means of a spool 80 slidingly mounted on the shaft 60 and having a conical face 82 for engagement with the outer end of the lever 76. The member 80 is operated by means of a clutch shipper 83 which is mounted on a shaft 84 and is provided with pins 85 projecting into an annular groove formed in the member 80. The clutch shipper 83 is provided with a forwardly and downwardly extending arm 86 (Fig. 3) which is engaged and lifted by an arm 87 fast on a rock shaft 88 operated by a treadle 90, so that the clutch shipper is swung rearwardly by depression of the treadle.

It will thus be evident that when the operator steps on the treadle 90 the spool 80 is moved by the treadle along the shaft 60 and operates the lever 76 to cause the co-operating friction clutch elements 68 and 73 to engage each other and start the machine, whereupon operative movement is imparted to the toggle-operating gear wheel 54 at a rate of speed which is considerably slower than that of the driving pulley 62. A cycle of operations to apply pressure to a shoe in one of the twin pressure mechanisms and to release a shoe previously operated upon by the other mechanism is effected by movement of the shaft 56 and the gear wheel 54 through a half-revolution, and it is accordingly desired to bring the machine automatically to a stop at each half-revolution of the shaft 56. The shaft 56 is, therefore, provided with controlling mechanism arranged to act on the clutch shipper 83 to disconnect the co-operating clutch elements from each other at the end of each half-revolution of the shaft. For this purpose there is secured on the shaft a collar 92 which carries a pin 94 arranged to project into a slot formed in one end of a sleeve 96 loosely mounted on the shaft, this sleeve being provided with a pair of diametrically opposite pins 98 each arranged to engage one side of a lug 100 on the clutch shipper 83 to move the latter in the opposite direction from that in which it is moved by the treadle. The slot in the end of the sleeve 96 permits relative turning movement of the sleeve and the collar 92 between the limits determined by engagement of the pin 94 with shoulders 101 at the opposite ends of the slot. A torsion spring 102 is arranged normally to position the sleeve 96 with the pin 94 at one end of the slot, as illustrated in Figs. 2 and 4. In the operation of the mechanism the sleeve 96 will thus turn with the shaft 56 until one of the pins 98 engages the lug 100 on the clutch shipper, and then the spring 102 will yield until the pin 94 is carried to the other end of the slot in the sleeve 96, whereupon the sleeve is operated by the pin to effect a positive release of the clutch by the movement of the clutch shipper in the direction to release the lever 76. As the clutch is released, the spring 102 acts on the sleeve 96 to carry the pin 98 past the lug 100, so that the machine may be again started by the treadle. Movement of the sleeve member 96 lengthwise of the shaft 56 away from the collar 92 is prevented by means of a collar 104 secured to the shaft at the opposite end of the member 96 from the collar 92.

The construction of the machine as thus far described does not differ substantially from that of machines heretofore in use. It will be evident that the machine will start as soon as sufficient pressure is applied to the treadle 90 to cause the co-operating clutch elements 68 and 73 to engage each other with friction enough to overcome the friction and inertia of the machine. Initially one of the shoe-supporting jacks and its co-operating pressure-applying pad are spaced apart sufficiently to permit a shoe to be conveniently inserted between them and mounted on the jack pin 14, and consequently a considerable amount of movement of the machine takes place before the pad arrives in position to apply substantial pressure to the shoe. In the meantime, however, the toggle of the other pressure-applying mechanism in which a shoe is held under pressure is broken, and as soon as it is broken the heavy spring 40, by its action on the lever 32 connected to that toggle, becomes effective upon the entire operating mechanism, including the clutch, with a tendency to drive the machine. It will be further understood that later in the cycle there is a substantial load on the clutch in the compression of the spring 40 to apply pressure to another shoe. It is therefore important for the proper operation of the machine that the friction clutch elements shall engage each other firmly enough to prevent the clutch from slipping. To guard against such slipping of the clutch and to facilitate control of the machine by the operator, the present invention provides automatic means for insuring that the friction clutch elements will be firmly engaged with each other. To this end, there are provided in diametrically opposite locations on the collar 104, previously referred to, a pair of cams 106 which are arranged to engage the opposite side of the lug 100 on the clutch shipper 83 from that engaged by the pins 98. The cams 106 are so arranged that one or the other of them becomes effective immediately upon the starting of the machine to force the spool 80 still farther in the direction in which it was forced by the treadle, if the treadle was not operated initially with such force as to move the spool the full distance required, and thereby to effect a firmer clutching engagement between the spiral clutch member 73 and the co-operating member 68. The operator is thus under the necessity of applying no more than a light force to the treadle sufficient to cause the machine to start from its position of rest, since one of the cams 106 becomes effective to set the clutch firmly by the time the spring 40 is released. After thus operating on the clutch, the cam 106 is carried beyond the lug 100 so that the latter may be moved in the opposite direction by one of the pins 98 to stop the machine at the end of the cycle.

The operation of the machine as a whole, including that of the automatic controlling mechanism, has been sufficiently described in connection with the description of the structural features, and requires no further explanation. While the invention is herein illustrated in its application to a machine of the twin type, it is not thus limited in utility, but is applicable generally to any type of shoe-pressing machine in which it may be desirable to guard against slipping of the clutch.

Having described the invention, what I claim as new and desire to secure by Letters Patent of the United States is:—

1. In a machine of the class described, a jack and a pressing member relatively movable to apply pressure to the bottom of a shoe on the jack, driving means including a friction clutch for effecting the relative pressure-applying movement, means for causing the co-operating friction clutch elements to engage each other and start the machine, and additional means to cause said clutch elements to engage each other more firmly.

2. In a machine of the class described, a jack and a pressing member relatively movable to apply pressure to the bottom of a shoe on the jack, driving means including a friction clutch for effecting the relative pressure-applying movement, means for forcing one of the friction clutch elements into operative engagement with its co-operating element to start the machine, and mechanism automatically operative after the starting of the machine to force said first mentioned clutch element into firmer engagement with its co-operating element.

3. In a machine of the class described, a jack and a pressing member relatively movable to apply pressure to the bottom of a shoe on the jack, driving means including a friction clutch for effecting the relative pressure-applying movement, manually operated means to cause the co-operating friction clutch elements to engage each other and start the machine, and mechanism automatically operative after the starting of the machine to insure firm driving engagement between said clutch elements.

4. In a machine of the class described, a jack and a pressing member relatively movable to apply pressure to the bottom of a shoe on the jack, driving means including a friction clutch for effecting the relative pressure-applying movement, a treadle for forcing one of the friction clutch elements into operative engagement with its co-operating element to start the machine, and mechanism driven by said clutch for forcing said treadle-operated clutch element into firmer engagement with the other element after the starting of the machine.

5. In a machine of the class described, a jack and a pressing member relatively movable to apply pressure to the bottom of a shoe on the jack, driving means including a friction clutch for effecting the relative pressure-applying movement, manually operated means to cause the co-operating friction clutch elements to engage each other and start the machine, and a rotary cam driven by said clutch and arranged to effect firmer engagement of said clutch elements with each other after the starting of the machine.

6. In a machine of the class described, a jack and a pressing member relatively movable to apply pressure to the bottom of a shoe on the jack, driving means including a friction clutch for effecting the relative pressure-applying movement, manually operated means to cause the co-operating friction clutch elements to engage each other and start the machine, a shaft parallel to the axis of the clutch and driven by the clutch, and a cam on said shaft arranged to effect firmer engagement of said clutch elements with each other after the starting of the machine.

7. In a machine of the class described, a jack and a pressing member relatively movable to apply pressure to the bottom of a shoe on the jack, driving means including a friction clutch for effecting the relative pressure-applying movement, a shaft co-axial with said clutch, a member movable along said shaft to force one of the friction clutch elements into operative engagement with its co-operating element to start the machine, a treadle-operated clutch shipper for operating said member, a shaft parallel to said first-named shaft and driven by the clutch, and a cam on said last-named shaft arranged to act on the clutch shipper to effect firmer engagement of the clutch elements with each other after the starting of the machine.

8. In a machine of the class described, twin mechanisms for applying pressure respectively to the bottoms of different shoes, a connection between said mechanisms to cause the release of pressure on a shoe by one of said mechanisms as pressure is applied to a shoe by the other mechanism, driving means including a friction clutch operative in a predetermined cycle to effect such release and application of pressure, spring means associated with said pressure-applying mechanisms to cause the pressure to be yieldingly applied, and automatic controlling means arranged to act on the clutch after the starting of the machine to guard against relative slipping movement of the friction clutch elements in response to the action of said spring means.

9. In a machine of the class described, twin mechanisms including spring means for applying pressure yieldingly to the bottoms of different shoes, a connection between said mechanisms to cause the release of pressure on a shoe by one of the mechanisms as pressure is applied to a shoe by the other mechanism, driving means including a friction clutch operative in a predetermined cycle to effect such release and application of pressure, manually operated means to cause the co-operating friction clutch elements to engage each other and start the machine, and mechanism driven by said clutch for causing said clutch elements to engage each other more firmly after the starting of the machine.

10. In a machine of the class described, twin mechanisms each including a spring-controlled toggle for applying pressure yieldingly to the bottoms of different shoes, a connection between said mechanisms to cause the release of pressure on a shoe by the breaking of the toggle of one of said mechanisms as pressure is applied to a shoe by the straightening of the toggle of the other mechanism, driving means including a friction clutch operative in a predetermined cycle to effect such release and application of pressure, manually operated means for forcing one of the friction clutch elements into operative engagement with its co-operating element to start the machine, and mechanism automatically operative after the starting of the machine to effect firmer engagement of said clutch elements with each other.

11. In a machine of the class described, twin mechanisms each including a toggle for applying pressure to the bottoms of different shoes, a connection between said mechanisms to cause the release of pressure on a shoe by the breaking of the toggle of one of said mechanisms as pressure is applied to a shoe by the straightening of the toggle of the other mechanism, a spring arranged to be subjected to stress by the straightening of each toggle and to react as the toggle is broken, driving means including a friction clutch for operating said mechanisms in a predetermined cycle to effect the release and application of pressure, and automatic controlling mechanism arranged to act on the clutch after the starting of the machine to guard against relative slipping movement of the friction clutch elements under the force of said spring.

In testimony whereof I have signed my name to this specification.

NORWOOD H. KNOWLTON.